Jan. 20, 1925.
Y. B. TORKELSEN
1,523,917
TIME CONTROLLED ELECTRIC SWITCH
Filed Jan. 31, 1924    2 Sheets-Sheet 1
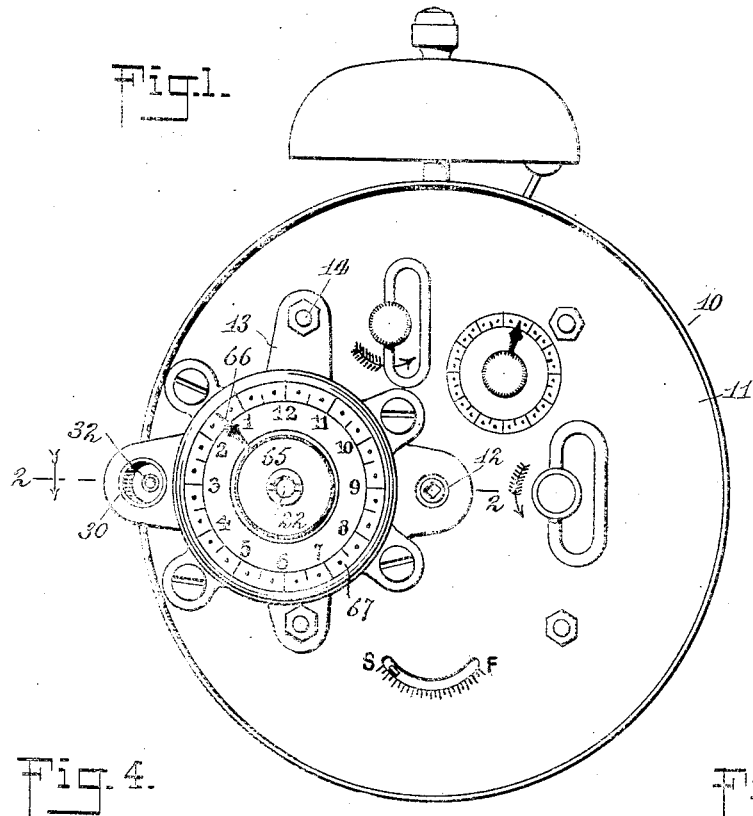
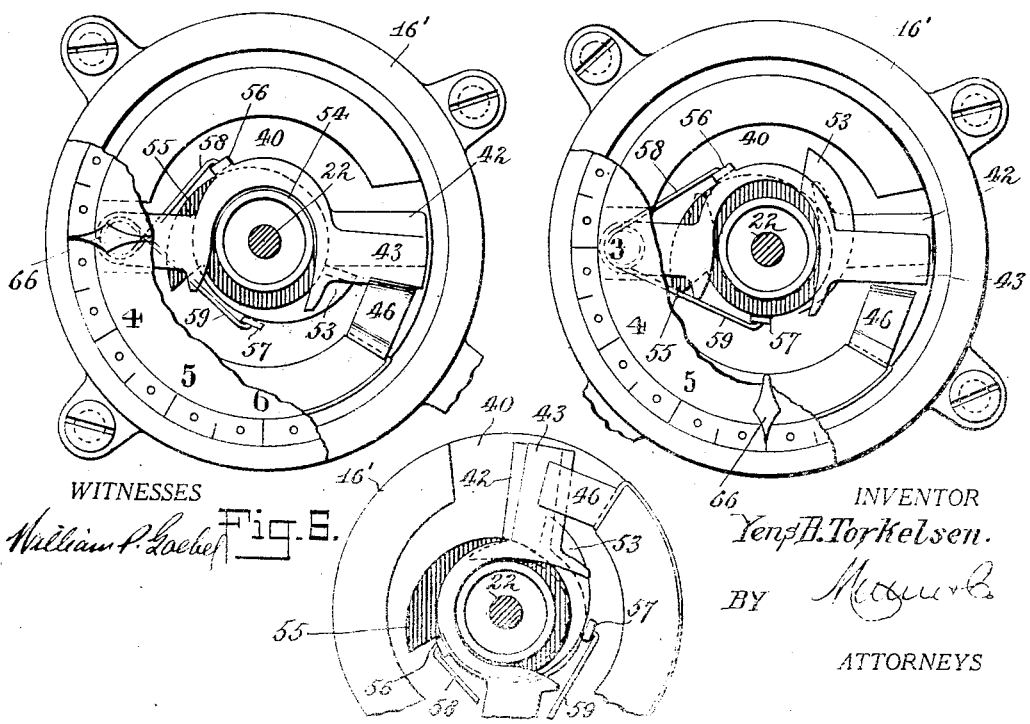
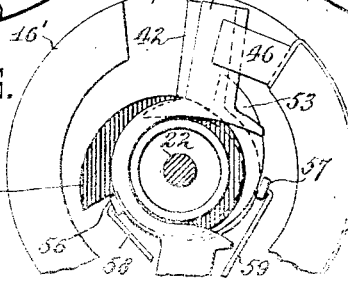

Jan. 20, 1925.
Y. B. TORKELSEN
TIME CONTROLLED ELECTRIC SWITCH
Filed Jan. 31, 1924
1,523,917
2 Sheets-Sheet 2
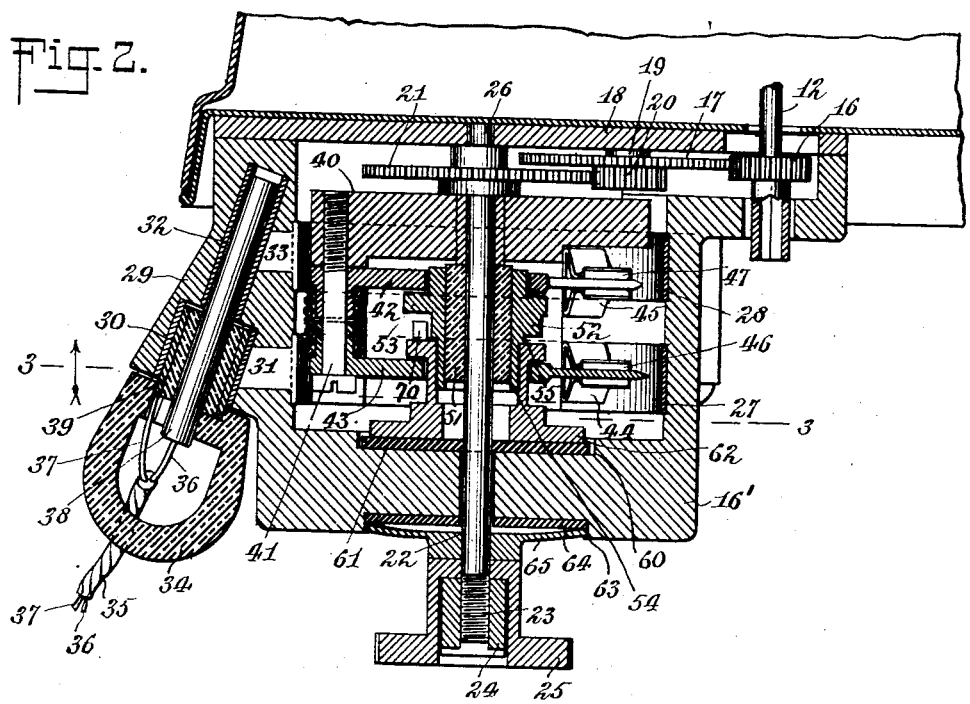
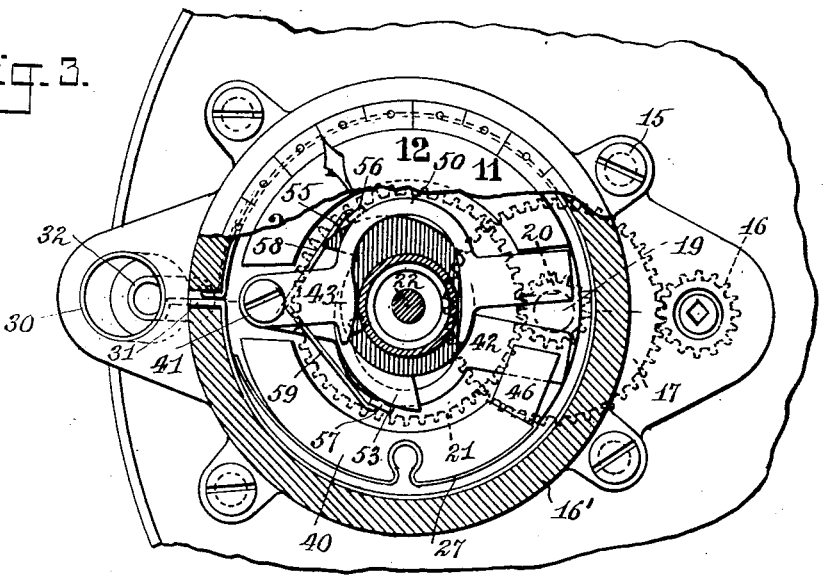
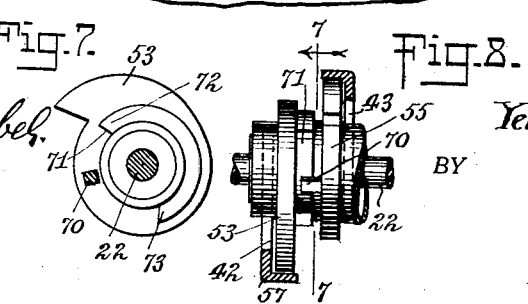
WITNESSES
INVENTOR
Yens B. Torkelsen.
BY
ATTORNEYS Patented Jan. 20, 1925.

1,523,917

UNITED STATES PATENT OFFICE.

YENS B. TORKELSEN, OF BROOKLYN, NEW YORK.

TIME-CONTROLLED ELECTRIC SWITCH.

Application filed January 31, 1924. Serial No. 689,767.

*To all whom it may concern:*

Be it known that I, YENS B. TORKELSEN, a subject of the King of Norway, and a resident of the city of New York, Borough of Brooklyn, in the county of Kings and State of New York, have invented a new and Improved Time-Controlled Electric Switch, of which the following is a full, clear, and exact description.

The present invention relates to new and useful improvements in time controlled mechanisms and it pertains more particularly to a time controlled electric switch.

It is one of the primary objects of the invention to provide a new and improved mechanism which operates to close an electric circuit and maintain the same closed for a predetermined period of time.

It is a further object of the invention to construct the mechanism in such a manner that the period of time during which the electric switch is maintained closed may be varied at the will of the operator.

It is a further object of the invention to construct a device capable of attachment to a clock or similar mechanism which will automatically close the circuit at a predetermined time and maintain said circuit closed for a predetermined time and automatically open said circuit at a predetermined time.

The device is especially adapted for use in connection with cooking stoves, heating stoves, and the like, wherein it is desired to operate the stove for a predetermined period beginning at a predetermined time and ending at a predetermined time.

With the above and other objects in view, reference is had to the accompanying drawings, in which—

Figure 1 is a view in rear elevation of a clock showing the manner of attachment of the new and improved mechanism thereto.

Fig. 2 is a detail sectional view taken on the line 2—2 of Fig. 1;

Fig. 3 is a detail sectional view taken on the line 3—3 of Fig. 2;

Fig. 4 is a detail sectional view showing the position of the parts during one stage of the operation;

Fig. 5 is a similar view showing the position of the parts during another stage of the operation;

Fig. 6 is a detail view showing the position of the parts at a third stage in the operation of the mechanism;

Fig. 7 is a detail sectional view of a portion of the mechanism and taken on the line 7—7 of Fig. 8;

Fig. 8 is a view in elevation, partly in section of a portion of the mechanism.

Referring more particularly to the drawings, the reference numeral 10 designates an alarm clock of conventional form, and 11 designates the rear wall thereof, the reference numeral 12 designating the hour-hand shaft projecting through the rear wall of the alarm clock.

In carrying out the invention, the plate 13 is secured to the rear wall of the alarm clock by means of bolts or the like, 14, and adapted to be secured to the plate by means of screws or the like, 15, there is a housing 16'. Mounted on the hour-hand shaft 12 of the alarm clock, there is a gear 16 meshing with a larger gear 17 mounted on the plate 13 by means of a spindle or the like, 19, which spindle is shown in dotted lines in Fig. 3. Carried by the spindle 19 there is a small gear 20, and such gear meshes with a larger gear 21 to be hereinafter further described.

Extending through the housing 16', there is a shaft 22, and such shaft has a screw-threaded end 23, which projects beyond the housing 16', as shown in Fig. 2. Secured to this shaft 22, by means of a nut 24, there is an operating member 25, by means of which the shaft is rotated, and said shaft extends through the gear 21, as at 26, and is loosely mounted therein.

Mounted internally of the housing 16', there are two bands 27 and 28 of suitable conducting material. The housing 16' is provided with an offset portion and said offset portion is provided with a passage of two diameters. Mounted in the larger diameter there is a lining 30, which is in contact with an arm 31 leading from the conductor band 27, and in the portion of the passage of smaller diameter there is a lining 32 which connects with the band 28 by means of an arm 33.

The reference numeral 34 designates a plug, and leading thereinto there is a conductor 35 having two wires 36 and 37. The wire 36 is connected to a plug member 38 and the wire 37 is connected to a shell member 39. When the plug is inserted into the opening in the offset portion 29 of the housing 16', its plug member 38 will contact with the lining 32 heretofore mentioned and the shell 39 will contact with the lining 30 heretofore mentioned and the current of the conductor 35 will be free to flow through the conductor bands 27 and 28. The conductor bands 27 and 28 are normally out of electric connection with each other and, therefore, the circuit is broken.

The reference numeral 40 designates a rotatable member mounted within the housing 16', and carried by the shaft 22 in such a manner as to move therewith when said shaft is rotated. The gear 21 heretofore mentioned is carried by the member 40 and serves as the means for driving the same from the hour-hand shaft 12 of the alarm clock 10 through the train of gearing heretofore described.

Carried by the member 40 there is a bolt 41, and pivotally mounted on such bolt are two knives 42 and 43, as more clearly shown in Fig. 2. Also carried by this member 40 are two contact members 44 and 45, the contact member 44 being adapted to engage the conductor band 27 and the contact member 45 engaging the conductor band 28. The contact member 44 is provided with resilient fingers 46 adapted to receive the knife 43 and the contact member 45 is provided with resilient fingers 47 adapted to receive the knife 42. As more clearly shown in Figs. 3 to 7, inclusive, each of the knives 42 and 43 is provided with a yoke portion 50 which is adapted to surround the shaft 22 and other elements carried thereby to permit of a pivotal movement of the knives about the bolt 41 without interference with the shaft 22 and the parts carried thereby.

Mounted on the shaft 22, there is a plug of suitable insulating material, 51, as more clearly shown in Fig. 2, and mounted on said plug of insulating material, 51, there is a sleeve 52. This sleeve 52 carries a cam 53 more clearly shown in Figs. 3 to 7, inclusive. Surrounding the sleeve 52 there is a sleeve 54, and such sleeve 54 carries a cam 55 more clearly shown in Figs. 3 to 7. The knife 42 is provided with a depending lug or the like 56, which is adapted for engagement with the cam 53 and the knife 43 is provided with a depending lug or the like, 57, adapted for engagement with the cam 55. Each of these knives is maintained in engagement with its respective cam by a spring, such spring surrounding the bolt 41 and having two arms, i. e., an arm 58 adapted to engage the knife 42 and an arm 59 adapted to engage the knife 43. Mounted in a recess 60 in the housing 16', there is a friction washer 61, and the cam member 55 heretofore mentioned has an enlarged base 62 adapted to engage said friction washer 61. Mounted in a recess 63 in the housing 16' there is a friction washer 64, and mounted on the shaft 22 and adapted to rotate therewith there is a disk 65, which disk is adapted to engage the friction washer 64 heretofore mentioned. This disk 65 has a pointer 66, and the rear wall of the housing 16' is calibrated as shown at 67, in an anticlockwise direction, and the pointer 66 heretofore mentioned is adapted to pass over such calibrations when the shaft 22 is turned in a manner and for a purpose to be hereinafter described.

Referring to Figs. 7 and 8, it will be noted that the cam 55 carries a projection 70, and that the cam 53 has a cut-out portion 71. The cut-out portion 71 of the cam 53 is adapted to receive the projection 70 of the cam 55 and such projection 70 is adapted to engage with the ends of the cut-out portions designated by the reference numerals 72 and 73 in Fig. 8.

The device functions in the following manner:

Referring to Fig. 2 in which the mechanism is in its normal inoperative position, the knife 42 is in engagement with its resilient fingers 47 but the circuit is broken owing to the fact that the knife 43 is disengaged with respect to its resilient fingers 46. As the alarm clock continues to run with the several parts in the position shown in Figs. 2 and 3, owing to the movement of the member 40, through the medium of the gear 21 the knives will be carried about their respective cams 53 and 55, and as their projections 56 and 57, respectively, pass over the high parts of the cams, the knives will be alternately engaged with and disengaged from their respective resilient fingers in such a manner that the circuit, which said knives control, will not be closed.

We will assume, for example, that it is desired to close the circuit at a predetermined time, say, 3 p. m., and maintains said circuit in closed condition for a period of three hours, that is, from 3 p. m. to 6 p. m. With the parts in the position shown in Figs. 2 and 3, the operating member 25 is turned to the right in Fig. 1, making almost a complete revolution from the position shown in Fig. 1, until it rests on the calibration of the numeral "3". This action rotates the shaft 22 and the cams 53 and 55, the cam 55 being rotated by engagement of the end 73 of the cut-out portion 71 of the cam 53 with the projection 70 carried by said cam 55.

Upon the completion of this step of the operation, the several parts assume the position shown in Fig. 4, that is, with the knife 43 about to engage with its respective resilient fingers 46 and the knife 42 disengaged with respect to its resilient fingers 47. With the parts in the position shown in this figure, the operating member 25 is now rotated to the left in said figure until the pointer 66 occupies a position over the calibration of the numeral "6". As the operating member 25 is turned to the left, the parts assume the position shown in Fig. 5, that is, the knife 43 remaining in approximately the same position with respect to its resilient fingers 46, as shown in Fig. 4, and the knife 42 in the position in which it is shown. By reference to Fig. 4, it will be noted that the cam 55 and the cam 53 are on the same side of the pointer or below the same. In Fig. 5, however, the cam 53 has moved to a position substantially diametrically opposite to the cam 55, which was occasioned by an operation of the operating member 25 to the left, the cam 55 being maintained against movement by reason of its engagement with the friction disk 61 mounted in the recess 60 in the housing 16'.

With the parts in the position shown in Fig. 5, operation of the alarm clock drives the gear 21 in the same direction of rotation as the hour-hand shaft 12 of the alarm clock, and as the gear 21 rotates the member 40 will be rotated therewith in the same direction and will cause the knives 42 and 43 carried thereby to move about the cams. As the member 40 continues to rotate, under the influence of the alarm clock the projection 57 of the knife 42 rides gradually over the face of the cam 53 and causes the knife 42 to gradually move into engagement with its respective resilient fingers 47. Simultaneously with this operation the projection 56 of the knife 43 is riding the cam surface of the cam 55, and after the knife 42 has engaged its respective fingers 47, the projection 56 of the knife 43 rides over the high surface and falls therefrom, moving the knife 43 into engagement with its respective resilient fingers 46. By reason of the knife 43 being operated by the spring arm 58, the engagement of the knife 43 with its resilient fingers 46 is instantaneous, thus causing a quick closing of the circuit and completing the same without arcing.

This position of the parts is shown in Fig. 6, and when the knives 42 and 43 are in engagement with their respective resilient fingers, the circuit is completed as follows:

From the conductor 36, through the plug 38, arm 33 of the band 28, resilient fingers 47, knife 42, through the bolt 41 to the knife 43, resilient fingers 46, band 27, arm 31, lining 30, shell 39 to the conductor 37.

With the parts in this position, as the clock continues to operate the projection 57 of the knife 42 rides the cam surface of the cam 53 until it reaches the end of the same (which will take about three hours in the present example). Immediately it reaches the end of the cam surface of the cam 53, under the influence of the spring 59 the knife 42 is rocked out of engagement with its respective resilient fingers 47 and instantly breaks the circuit without arcing.

From the foregoing it is apparent that the mechanism may be employed to close and open an electric circuit at predetermined intervals, thus rendering the device capable of maintaining the circuit closed through a predetermined period of time, and that such predetermined period of time may be varied at will by the adjustment of the cams 53 and 55 relative to each other, which adjustment is carried out by the operation heretofore described.

What is claimed is:

1. In a time controlled electric switch, a plurality of contacts, a switch knife adapted for engagement with each of said contacts to complete an electric circuit, and means operated by a motor driven mechanism for operating said switch knives, said means comprising a rotating body on which said switch knives are pivotally mounted and a plurality of normally immovable cams about which the switch knives are adapted to rotate.

2. In a device of the character described, a housing adapted to be attached to the rear face of an alarm clock, a body portion rotatably mounted in said housing, means connecting the body portion with the alarm clock mechanism whereby the body portion will be rotated by the alarm clock mechanism, a plurality of contacts carried by the housing, a plurality of switch knives adapted to engage the contacts, and normally immovable cams about which the body portion and the switch knives are adapted to rotate, said cams serving to cause engagement of the switch knives with the contacts and disengagement of the switch knives from the contacts as the switch knives rotate about the same.

3. In a device of the character described, a housing adapted to be attached to the rear face of an alarm clock, a body portion rotatably mounted in said housing, means connecting the body portion with the alarm clock mechanism whereby the body portion will be rotated by the alarm clock mechanism, a plurality of contacts carried by the housing, a plurality of switch knives adapted to engage the contacts, normally immovable cams about which the body portion and the switch knives are adapted to rotate, said cams serving to cause engagement and disengagement of the switch knives with the contacts as the switch knives rotate about the cams, and means for setting said cams to determine the relative time at which the switch knives engage their respective contacts.

4. In a mechanism of the class described, a housing adapted to be secured to an alarm clock, a plurality of spaced conductors mounted interiorly of said housing, a rotatable body member mounted within the housing, a train of gearing connected with the alarm clock mechanism for rotating said body member, a plurality of contacts carried by the rotating body member, each of said contacts having one end terminating in spring fingers and the other end contacting with its respective conductor, knife switches carried by the rotating body member and adapted for engagement with the resilient fingers of the contact members, and a cam for operating each of said knife switches, said cams being normally immovable and serving to operate the knife switches as they move thereabout.

5. In a mechanism of the class described, a housing adapted to be secured to an alarm clock, a plurality of spaced conductors mounted interiorly of said housing, a rotatable body member mounted within the housing, a train of gearing connected with the alarm clock mechanism for rotating said body member, a plurality of contacts carried by the rotating body member, each of said contacts having one end terminating in spring fingers and the other end contacting with its respective conductor, knife switches carried by the rotating body member and adapted for engagement with the resilient fingers of the contact members, a cam for operating each of said knife switches, said cams being normally immovable and serving to operate the knife switches as they move thereabout, and means whereby said cams may be adjusted relatively to each other to cause the knife switches to engage their spring fingers at a predetermined time.

6. In a mechanism of the class described, a housing adapted to be secured to an alarm clock, a plurality of spaced conductors mounted interiorly of said housing, a rotatable body member mounted within the housing, a train of gearing connected with the alarm clock mechanism for rotating said body member, a plurality of contacts carried by the rotating body member, each of said contacts having one end terminating in spring fingers and the other end contacting with its respective conductor, knife switches carried by the rotating body member and adapted for engagement with the resilient fingers of the contact members, a cam for operating each of said knife switches, said cams being normally immovable and serving to operate the knife switches as they move thereabout, and means whereby said cams may be adjusted relatively to each other to cause the knife switches to engage their spring fingers at a predetermined time to close an electric circuit through the conductors and the contacts and the knife switches, and subsequently and automatically to open said electric circuit.

YENS B. TORKELSEN.